US006547966B2

(12) United States Patent
Allmendinger et al.

(10) Patent No.: US 6,547,966 B2

(45) Date of Patent: Apr. 15, 2003

(54) IN-LINE BASKET FILTER FOR A SPRAY SPOUT ASSEMBLY

(75) Inventors: Otto Karl Allmendinger, Noblesville, IN (US); Garry Robin Marty, Fishers, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 0 days.

(21) Appl. No.: 09/804,759

(22) Filed: Mar. 13, 2001

(65) Prior Publication Data

US 2001/0010342 A1 Aug. 2, 2001

Related U.S. Application Data

(62) Division of application No. 09/379,042, filed on Aug. 23, 1999, now Pat. No. 6,227,464.

(51) Int. Cl.[7] ................................................ B01D 35/02

(52) U.S. Cl. .............................. 210/497.01; 210/497.3; 210/498; 210/136; 210/432; 210/452

(58) Field of Search ................................ 210/136, 250, 210/432, 448, 449, 497.01, 497.3, 498, 452

(56) References Cited

U.S. PATENT DOCUMENTS

| | | | | |
|---|---|---|---|---|
| 4,646,779 A | | 3/1987 | Johnson | |
| 4,657,185 A | | 4/1987 | Rundzaitis | |
| 4,839,038 A | * | 6/1989 | McLain, II | 210/137 |
| 5,354,468 A | * | 10/1994 | Richards | 210/448 |
| 5,545,318 A | * | 8/1996 | Richmond | 137/1 |
| 5,699,832 A | | 12/1997 | Burchard et al. | |
| 5,865,378 A | | 2/1999 | Hollinshead et al. | |

* cited by examiner

*Primary Examiner*—Matthew O. Savage

(74) *Attorney, Agent, or Firm*—Reising, Ethington, Barnes, Kisselle, Learman & McCulloch, PC

(57) ABSTRACT

A hand held spray spout (10) has a basket filter (26) seated against an anti-siphon valve (24) proximate the base end of a water passage (12) within the spout. The filter has a plurality of protrusions (50) mounted within the inner diameter of the valve (24) and is also biased against the rim (52) of the valve. The filter has prongs (56) extending upstream from the basket section (40) to abut and be biased by a supply hose end which is mounted to the base end (14) of the hand held spray spout (10).

5 Claims, 6 Drawing Sheets

IN-LINE BASKET FILTER FOR A SPRAY SPOUT ASSEMBLY

CROSS-REFERENCE TO RELATED APPLICATION

This is a divisional application of U.S. patent application Ser. No. 09/379,042, filed on Aug. 23, 1999 now U.S. Pat. No. 6,227,464.

TECHNICAL FIELD

The field of this invention relates to an inline filter and an anti-siphon assembly for a hand held spray spout for a faucet or showerhead.

BACKGROUND OF THE DISCLOSURE

Hand held spray spouts for kitchen faucets are becoming popular. The spray spout can either be mounted in a faucet base and used as a conventional faucet or held in a hand to easily change the direction and placement of the discharged water. Secondly, an operator may easily select to have the discharged water flow as an aerated stream or a spray. The selection is made with the mere touch of an operating button.

In order for the spray portion of the faucet to be maintained in good working order it is desirable to keep the water stream free from any particulates that may large enough to lodge into or entirely block any of the small apertures that form the water spray.

Secondly, anti-siphon valves have long been associated with plumbing fixtures to prevent back flow conditions if per chance the water supply pressure becomes negative while the hand held spray spout is simultaneously submerged in a basin of water with the mixing valve in the on position.

What is needed is a filter that strains large particulates from the water entering the spray spout of the faucet while being conveniently mounted in the spray head. What is also needed is a filter that can also seat the anti-siphon valve and render it additional support against collapse. What is also needed is a filter and anti-siphon assembly that puts a pre-load on the anti-siphon valve base to also provide additional support against collapse.

SUMMARY OF THE DISCLOSURE

In accordance with one aspect of the invention, a hand-held faucet spray spout includes a water passage extending from a base section to a downstream end that has a plurality of apertures letting water spray therethrough. A filter is operably mounted in said water passage for filtering particulates from water before it passes to the plurality of apertures.

The filter has a basket section with a tapered side with filtering ports therethrough. Preferably, a plurality of the filtering ports are on the tapered side of said basket section and are in the form of elongated slots that axially extend along the tapered side. Filtering ports also on the upstream end of the basket.

An anti-siphon valve is mounted downstream from the filter. The filter has a seat section for seating the anti-siphon valve downstream from the filter. Preferably, the seat section has a plurality of circumferentially spaced protrusions extending downstream from the basket section and into the anti-siphon valve for supporting said anti-siphon valve against collapse when a reverse water pressure is in said water passage. The spaced protrusions are radially inner extensions of axially extending ribs that are formed between the slots on the tapered side of the basket section.

It is also desirable that the basket section has a plurality of circumferentially spaced prongs extending upstream for abutting against a supply hose for applying a pre-load pressure onto said filter and said anti-siphon valve. The prongs are radially outer extensions of the ribs that are formed between the slots on the tapered side of the basket section.

In accordance with another aspect of the invention, a filter component for a water hand held spray spout has the above described properties and construction.

BRIEF DESCRIPTION OF THE DRAWINGS

Reference now is made to the accompanying drawings in which.

DETAILED DESCRIPTION OF THE PREFERRED EMBODIMENT

Figure 1:
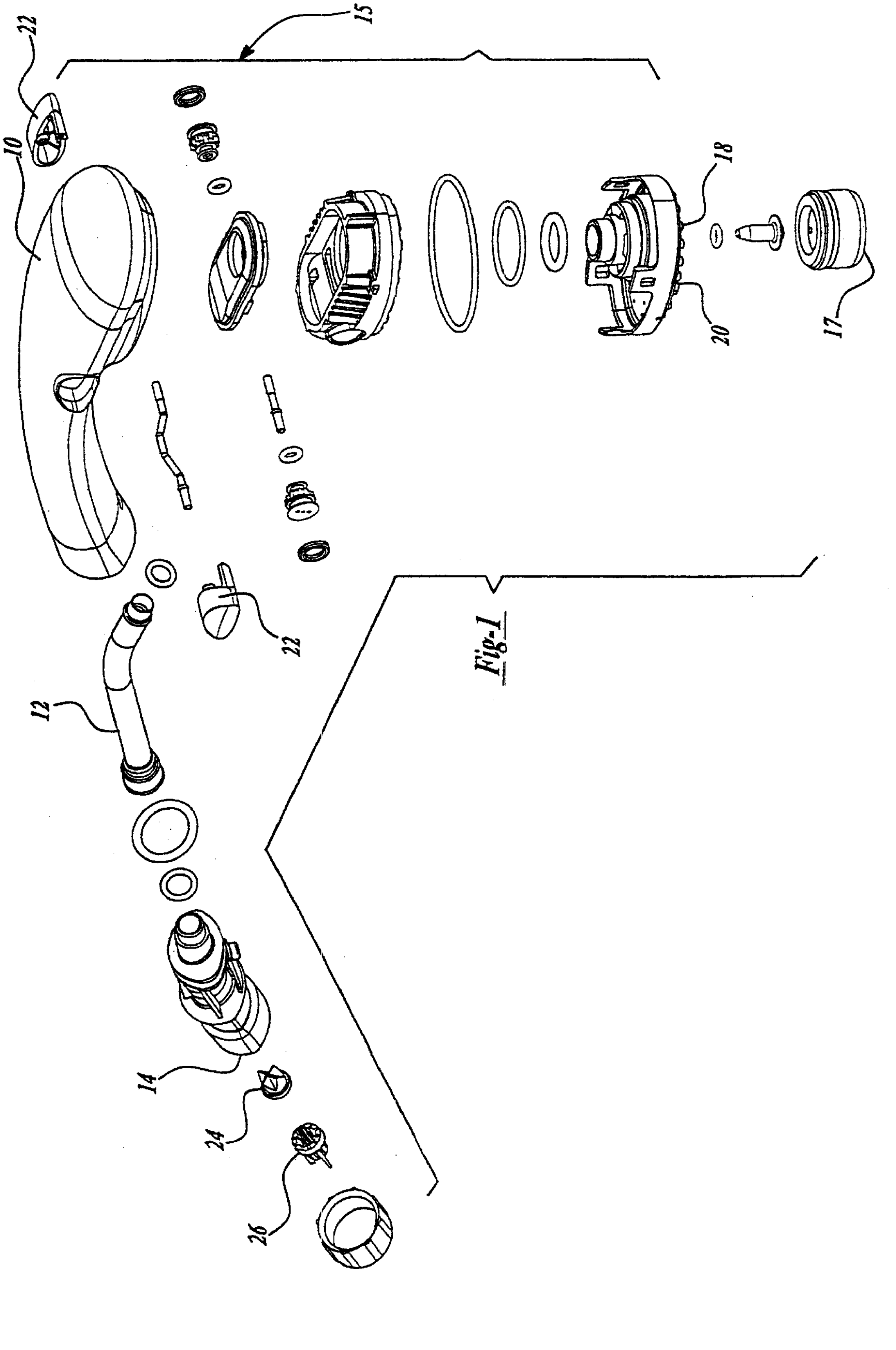
FIG. 1 is an exploded perspective view of a faucet spray head incorporating a basket filter which seats an anti-backup valve.
Figure 2:
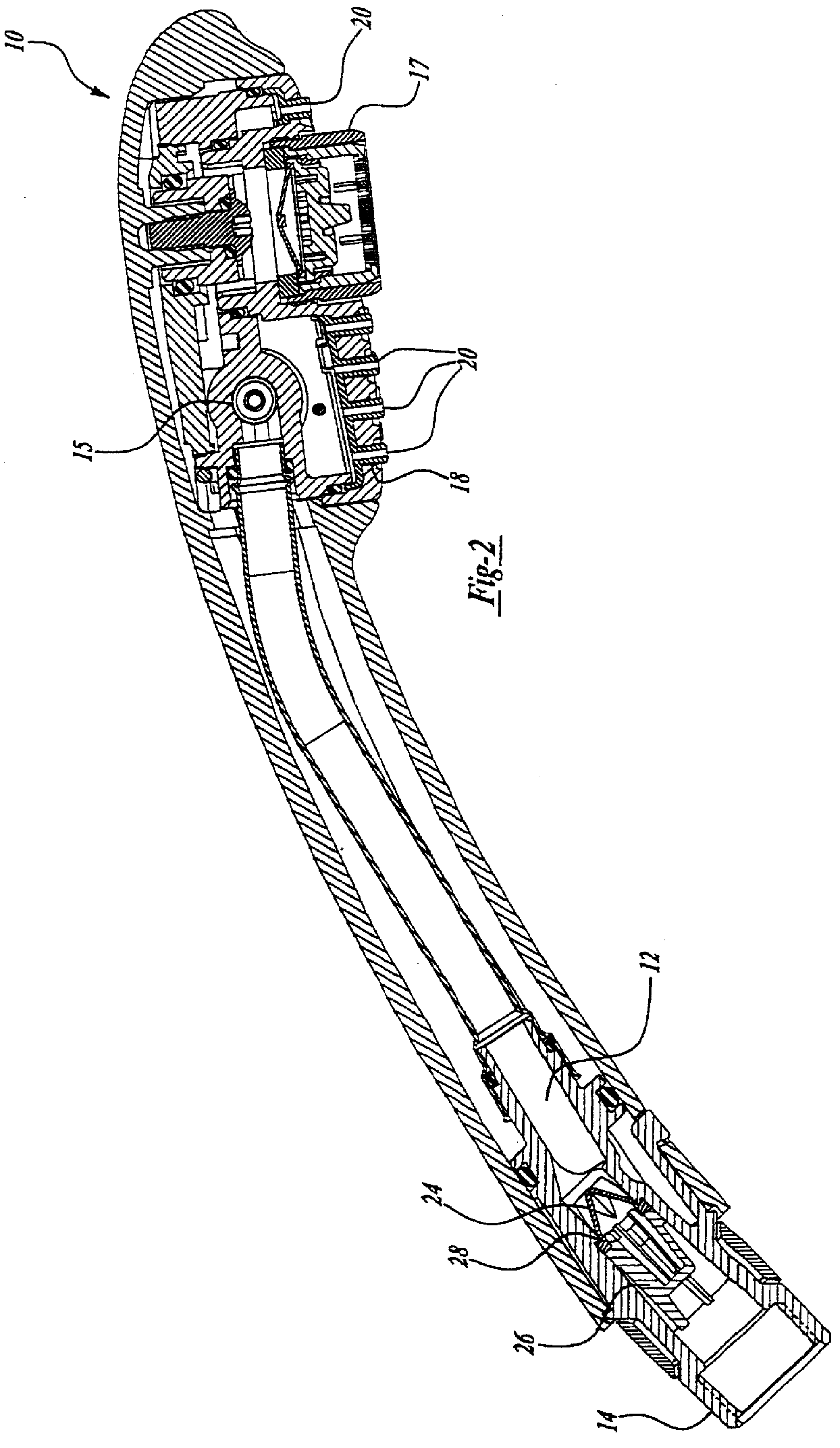
FIG. 2 is a segmented elevational view of a faucet spray head shown in FIG. 1.

Referring now to FIGS. 1 and 2, a spray spout body 10 has a water passage 12 therethrough from a base inlet end 14 to a spray-aerator end 17. An internal mechanism generally indicated as 15 allows selection of water flow between an aerated flow or a spay flow via operation of a pair of opposing buttons 22. The spray-aerator end 16 has an aerator 17 that screws into a spray section 18. The spray section 18 has a plurality of apertures 20 that form a spray or shower when this mode is selected via a button 22.

Figure 3:
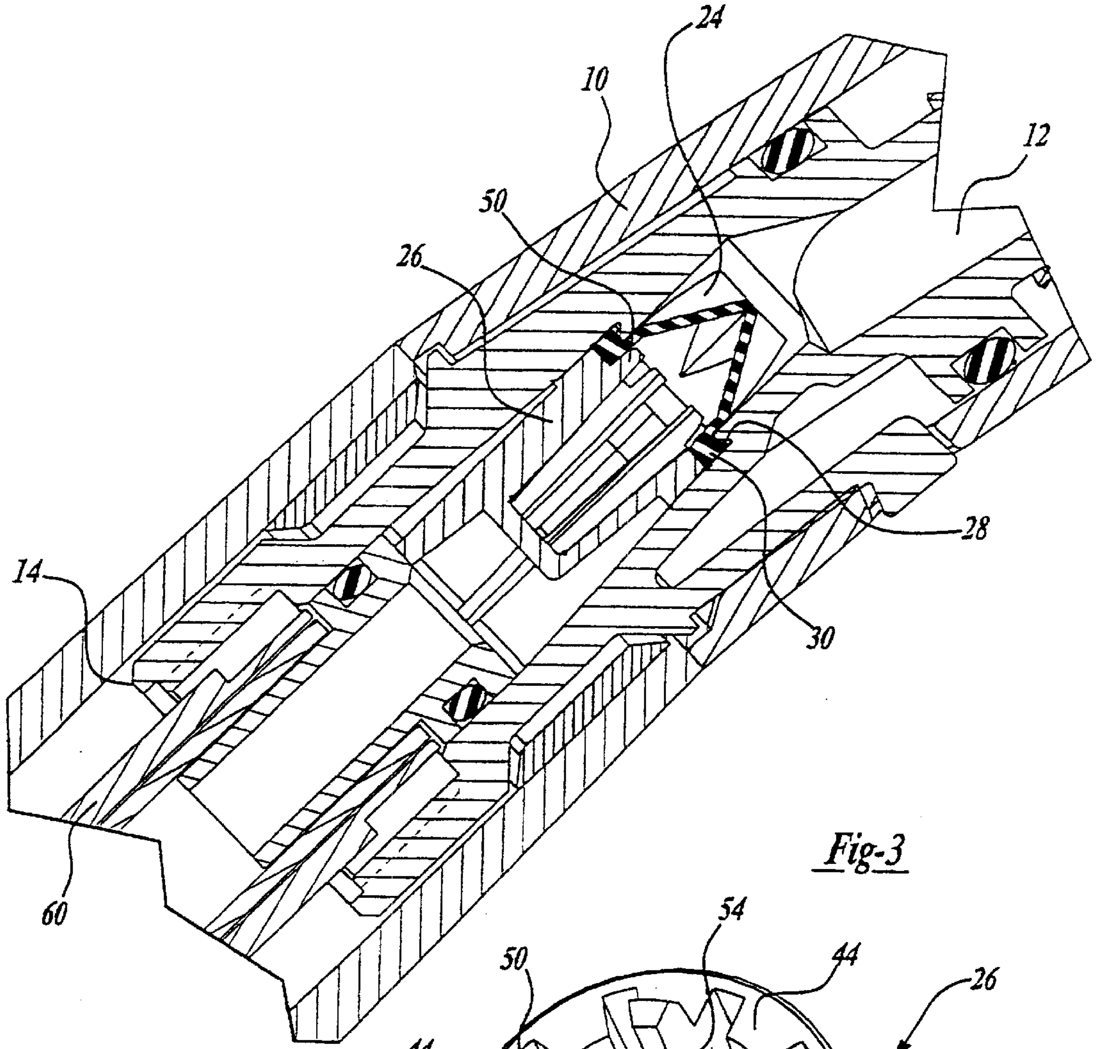
FIG. 3 is in an enlarged segmented side view of the adapter section housing the anti-siphon valve and basket filter connected to a flexible hose end.
Figure 4:
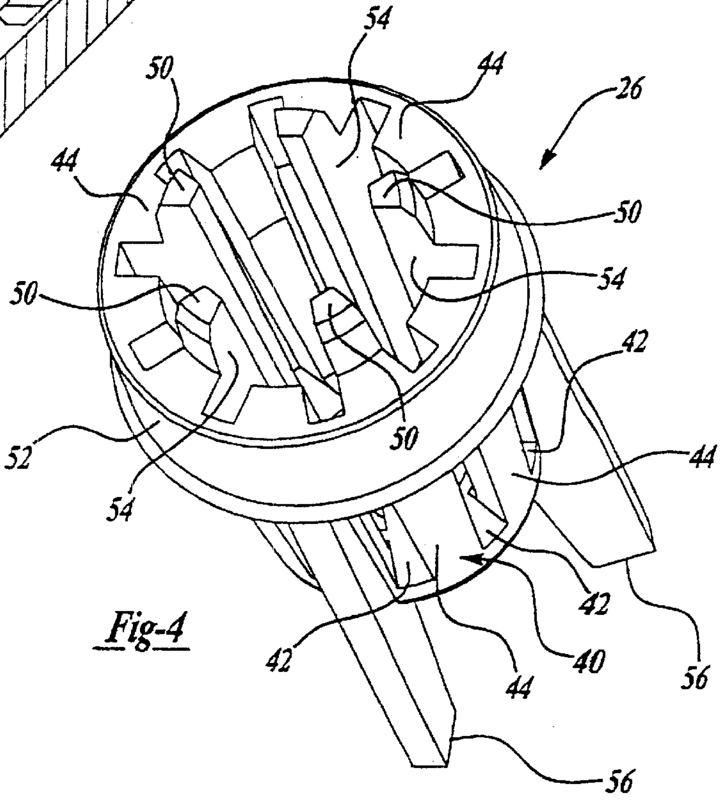
FIG. 4 is an enlarged perspective view of the basket filter shown in FIG. 1.
Figure 5:
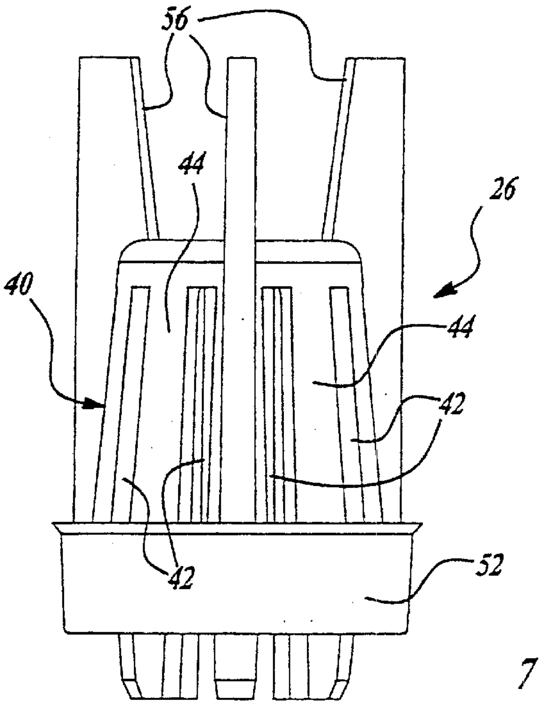
FIG. 5 is an enlarge side elevational view of the basket filter shown in FIG. 1.

As more clearly shown in FIGS. 2 and 3, an anti-siphon valve 24 and a basket filter 26 are seated in the water passage 12 in proximity to the base end 14 of the spray spout 10. The passage has a shoulder 28 that seats a radially outer upstream rim 30 of said anti-siphon valve 24. The shoulder 28 has a negative taper to secure the rim 30 as explained in more detail.

Figure 11:
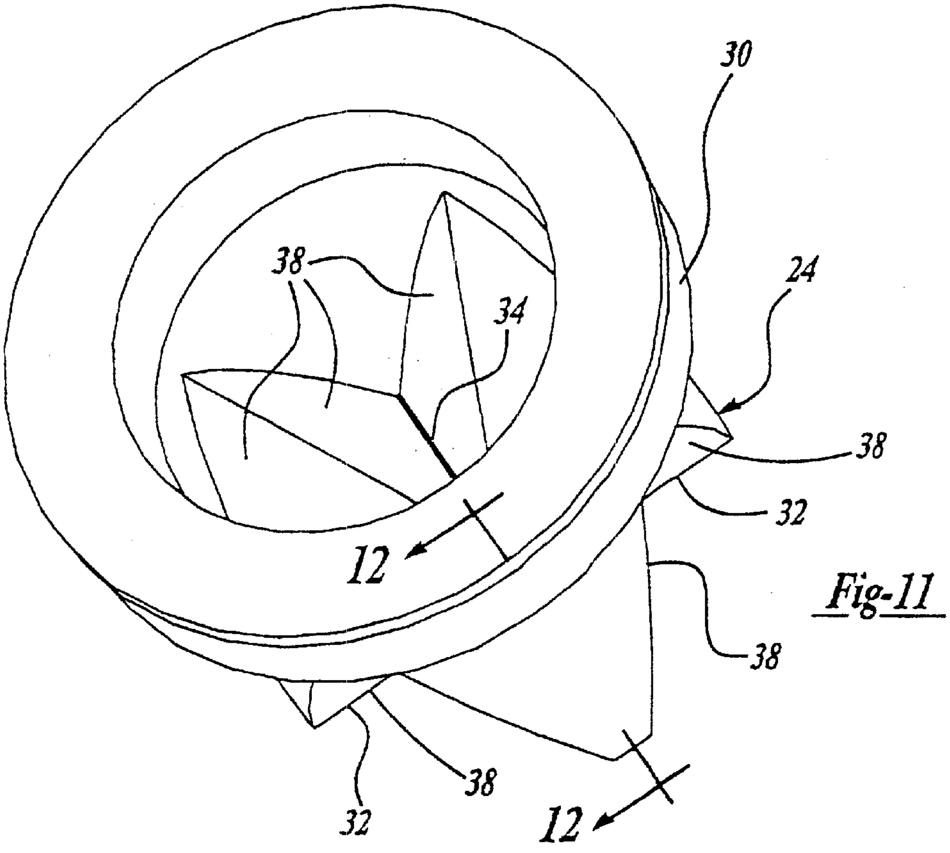
FIG. 11 is an enlarged perspective view of a anti-siphon valve shown in FIG. 1.
Figure 12:
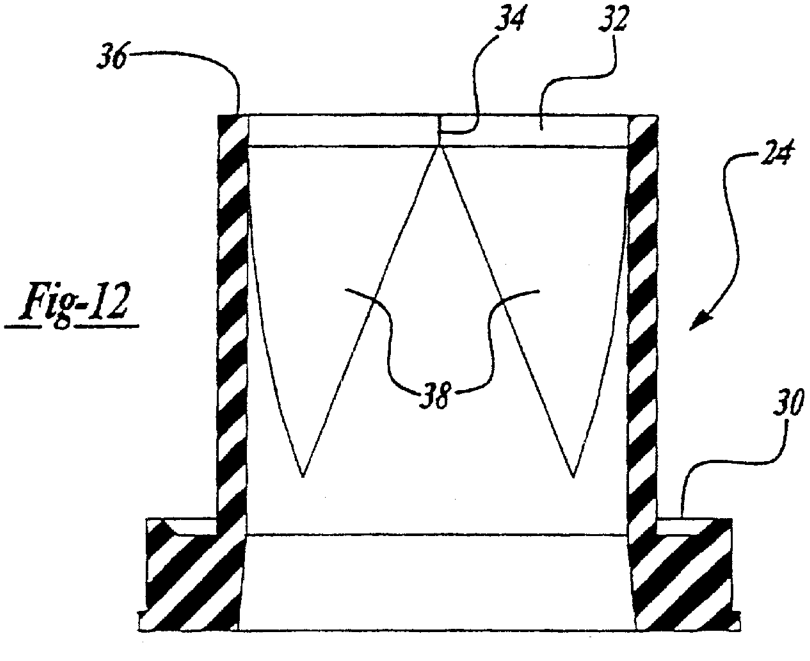
FIG. 12 is a cross-sectional view taken along.

The anti-siphon valve 24 is a duck bill type made from a commercially available elastomeric material approved for drinking and potable water, for example a basic grade of silicone rubber. As shown more clearly in FIGS. 11 and 12, the shown anti-siphon valve has two openable slots 32 and 34 that are formed at downstream ends 36 of flexible quadrants 38. When water is flowing to the shower head the valve is elastomericaly deformed to open the slots and allow passage of water therethrough. However, if there is reverse pressure in passage 12, the quadrants close up slots 32 and 34 and prevent the back-flow of water.

Figure 6:
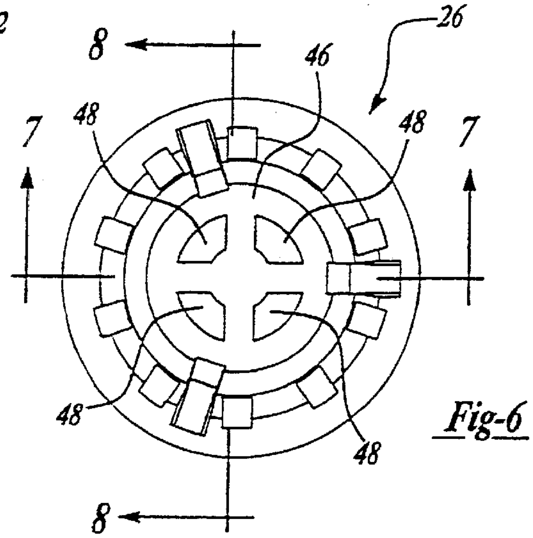
FIG. 6 is an upstream end view of the basket filter shown in FIG. 1.
Figure 7:
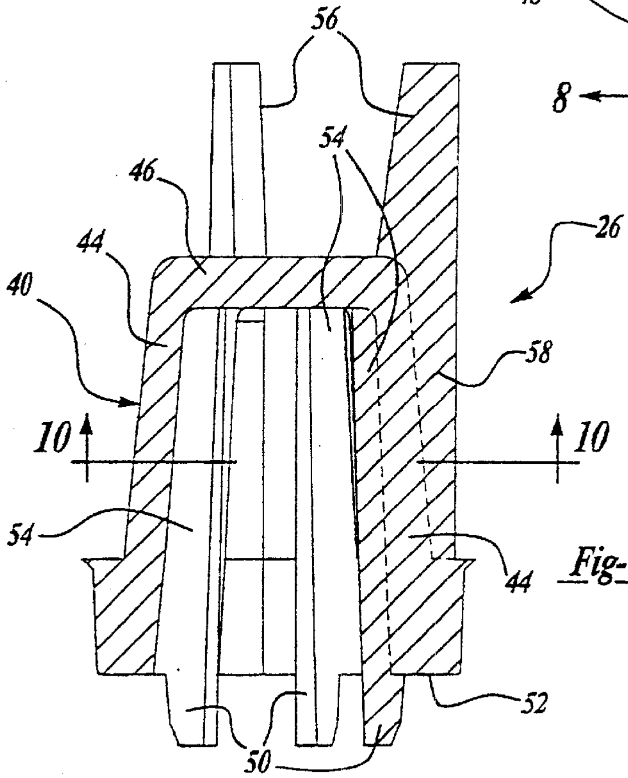
FIG. 7 is a cross-sectional view taken along lines 7—7 in FIG. 6.
Figure 8:
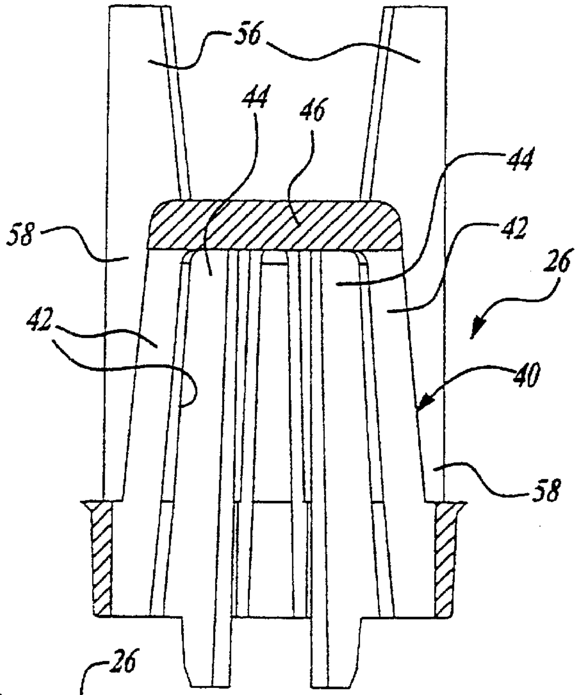
FIG. 8 is a cross-sectional view taken along lines 8—8 in FIG. 6.
Figure 9:
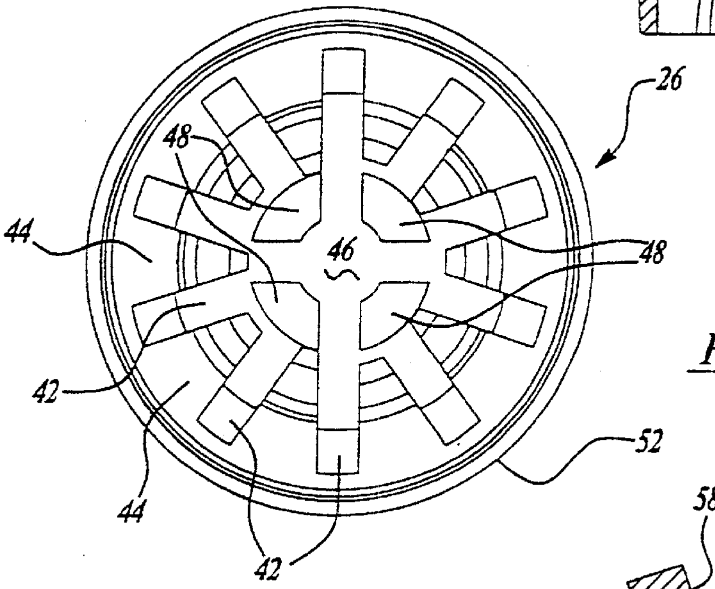
FIG. 9 is a downstream end view of the basket filter.
Figure 10:
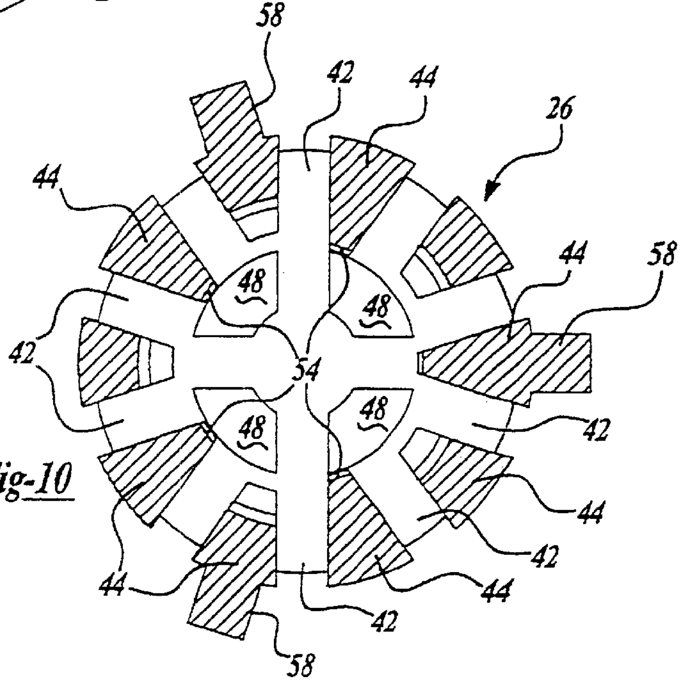
FIG. 10 is a cross-sectional view taken along line 10—10 shown in FIG. 8.

As shown in FIGS. 4–10, the basket filter 26 has a tapered side 40 with a plurality of slots 42 and ribs 44. The basket filter 26 is made from a commercially available semi-flexible plastic suitable or potable water lines, for example a non-filled polypropylene or nylon. The slots extend axially along the tapered side and are sized to screen larger particulates that would lodge or block the apertures 20 in the spray 18. As shown in FIG. 6, the upstream end 46 of the basket filter also has a plurality of ports 48.

Extending downstream from and axially beyond the basket section 40 are a plurality of protrusions 50 which fit within the inner diameter of rim 30 of the anti-siphon valve as illustrated in FIG. 2. The protrusions 50 prevent radially inward collapse of the ani-siphon valve 24 when reverse water pressure exists in the passage 12. The filter 26 also has a seating rim 52 that abuts the upstream side of the rim 30. For construction reasons and for strength purposes, the protrusions 50 are axial extension of radially inner extensions 54 of axially extending ribs 44 as most clearly shown in FIGS. 7 and 10. The protrusions also are radially positioned within the inner diameter of the rim 52.

The upstream end 46 of the basket filter has a plurality of axially extending prongs 56. The prongs for construction reasons and for strength purposes are axial extensions of radially outer extension 58 of ribs 44 as most clearly shown in FIGS. 7 and 10. The prongs are long enough to have flexibility. When a supply hose 60 is screwed into the base end 14 of the spray spout, the downstream end of the supply hose abuts and presses against the prongs 56 as illustrated in FIG. 3. The prongs 56 may flex to compensate for any shortened distance between the downstream end of the supply hose 60 and the upstream end 46 of the basket section. The flexing of the prongs causes the rim 52 of the filter to place a pre-load on the rim 30 of anti-siphon valve. This pre-load also helps prevent collapse or unseating of the elastomeric anti-siphon valve rim 30 from the negative tapered shoulder 28. The pre-load helps the rim 30 become cinched between the rim 52 of the filter and the negatively tapered shoulder 28. This arrangement is secure even when a reverse pressure exists within the water passage 12.

In this fashion, a filter and anti-siphon assembly is provided in a hand-held spray spout. The filter provides for straining out large particulates, maintains a support within an inner diameter of the anti-siphon valve and provides a pre-load on the anti-siphon valve. The support and pre-load help prevent potential collapse of the elastomeric anti-siphon valve when a negative pressure exists in the water passage.

Variations and modifications are possible without departing from the scope and spirit of the present invention as defined by the appended claims.

The embodiments in which an exclusive property or privilege is claimed are defined as follows:

1. A filter for filtering particulates from a water spray head; said filter being characterized by:

said filter having a basket section with a side extending longitudinally from an open end to an end with a plurality of ports therethrough, said side having filtering ports therethrough;

said open end having a rim defining a seat section for seating an anti-siphon valve downstream from said filter; and a plurality of circumferentially spaced protrusions having radially outer surfaces that extend axially outwardly beyond said open end and positioned radially inwardly of said seat section defined by said rim for preventing said anti-siphon valve from collapsing radially inwardly into said open end.

2. A filter for filtering particulates from a water spray head as defined in claim 1 further characterized by:

said basket section having a plurality of circumferentially spaced prongs extending beyond said end with said plurality of ports.

3. A filter for filtering particulates from a water spray head as defined in claim 2 further characterized by:

said filtering ports on the side of said basket section being elongated slots that longitudinally extend along said side.

4. A filter for filtering particulates from a water spray head as defined in claim 3 further characterized by:

said plurality of spaced protrusions being radially inner extensions of longitudinally extending ribs that are formed between the slots on the side of said basket section.

5. A filter for filtering particulates from a water spray head as defined in claim 4 further characterized by:

said prongs being radially outer extensions of a plurality of said ribs that are formed between the slots on the side of said basket section.

* * * * *